(No Model.)
F. R. BODLEY.
NUT LOCK.
No. 525,328.  Patented Sept. 4, 1894.
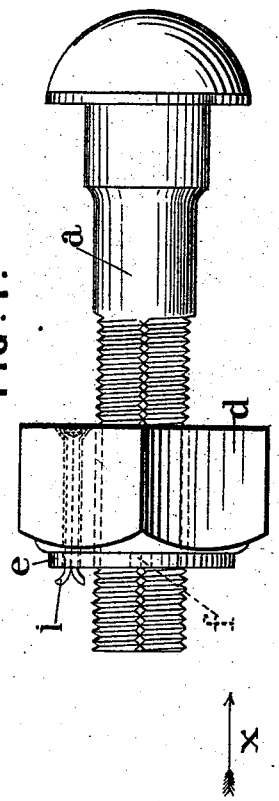
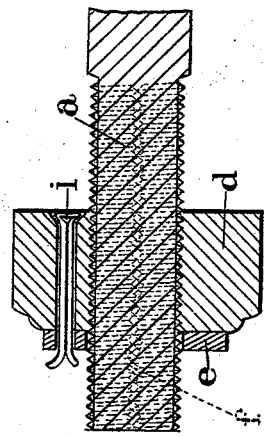
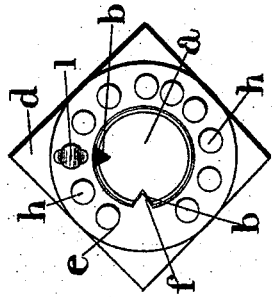
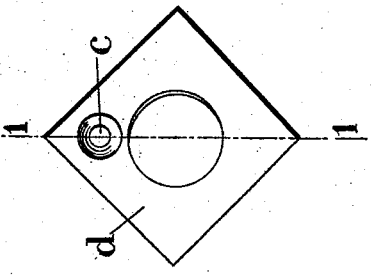
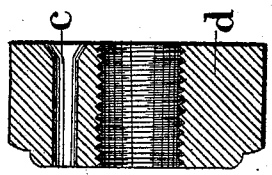
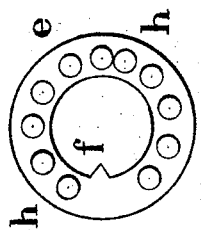
WITNESSES
H. Birkbeck
G. W. Hey
INVENTOR
Frederick R. Bodley

UNITED STATES PATENT OFFICE.

FREDERICK ROBERT BODLEY, OF LONDON, ENGLAND.

NUT-LOCK.

SPECIFICATION forming part of Letters Patent No. 525,328, dated September 4, 1894.

Application filed January 30, 1894. Serial No. 498,542. (No model.) Patented in England November 23, 1893, No. 22,419.

*To all whom it may concern:*

Be it known that I, FREDERICK ROBERT BODLEY, builder, a subject of the Queen of Great Britain, residing at 9 Alleyne Terrace, Park Road, West Dulwich, London, England, have invented Improvements in Locking-Nuts, (for which I have obtained Letters Patent in Great Britain, No. 22,419, dated November 23, 1893,) of which the following is a specification.

This invention relates to a safety nut locking device and is especially designed to produce a cheap, simple and practicable means of locking the nuts on bolts used in securing railway rails and is also applicable to locking nuts upon bolts used for any other purposes where they are subjected or liable to great vibration and consequently require a means of locking same with absolute safety.

In order that my present invention may be easily understood and readily carried into practice I will proceed to describe the same with reference to the drawings hereunto annexed.

Figure 1 is a longitudinal view of bolt with nut locked thereon according to my present invention. Fig. 2 is a longitudinal sectional view of the nut—and locking appliance—upon the threaded part of the bolt. Fig. 3 is an end view of Figs. 1 and 2—looking in the direction of the arrow $x$. Fig. 4 is a view of the back of the nut—removed from the bolt—*i. e.,* looking in the opposite direction of the arrow $x$. Fig. 5 is a vertical section of the nut—on line 1—1 Fig. 4. Fig. 6 shows the locking pin known as a "linch pin." Fig. 7 is a view of the washer.

$a$ is the bolt.

$b\ b$ are two V-shaped longitudinal parallel grooves cut or formed in the threaded part of the bolt and of a greater depth than said thread—said two grooves $b\ b$ being advantageously distant from one another at a quarter of the circle of the bolt or thereabout.

$c$ is a longitudinal hole through nut $d$—with countersink at the back face of nut—as shown.

$e$ is a washer (to fit closely the threaded part of bolt) of special construction, viz., with a single tooth $f$ on the inner edge thereof and having numerous holes $h$ therein at graduated distances apart as shown in Figs. 3 and 7 and as hereinafter explained.

$i$ is the fastening pin—headed at one end and split at the other.

The operation is as follows:—The pin $i$ is placed in the hole $c$ in the nut $d$—the head of the pin lying in the countersink on the back of the nut so as not to project beyond the plane of the back of the nut. The nut $c$ is then placed on its bolt $a$ and screwed up to the point of tightness (or otherwise) as desired and then to safely lock and firmly secure this nut exactly in its position the specially constructed washer $e$ is placed on the bolt—the tooth $f$ fitting into the one or the other of the grooves $b$ so that one of the holes $h$ on said washer will fit over the split end of the pin $i$ which split ends are then opened and turned backward toward the washer and thereby the washer is fixed to the nut and as the tooth $f$ is held in groove $b$ therefore the washer $e$ cannot revolve and consequently the nut $d$ cannot revolve and is thus locked and immovably held in position. To remove the nut—the split ends of pin $i$ are pinched or pressed together so as to permit the washer $e$ to be drawn off said pin $i$ and off the bolt $a$ whereupon the nut $d$ is again free to be revolved in any suitable manner. The position of the holes $h$ in the washer $e$ are advantageously determined and arranged as follows, viz:—The holes $h$ are exactly concentric and these holes down one side of the washer to the left of tooth $f$ occupy exactly the position of the solid parts between the holes on the other side and vice versa,—so that, when the washer is placed on the bolt $a$, in case one of the holes therein does not correspond with the position of the pin $i$ by withdrawing and reversing the washer then a hole will be found to exactly correspond to the position of $i$ and fit over the same. I find it advantageous not to place any hole or holes $h$ just over the tooth $f$ so that the latter may not be thereby weakened in any way.

Having thus described my invention, what I claim as new, and desire to secure by Letters Patent of the United States, is—

The combination with a screw threaded bolt having a longitudinal groove in the threaded part thereof, of a nut fitting said bolt, a linch pin carried in said nut and a washer fitting said bolt and having a tooth on the inner edge thereof adapted to fit in said longitudinal groove and thereby prevent rotation of the washer and a series of concentric holes around such washer adapted to fit the said linch pin and arranged in such manner that the said holes down one side occupy the position of the solid concentric portion of the washer down the other side and vice versa so that one or other of said holes will always fit over said linch pin whatever its position substantially as and for the purposes set forth.

FREDERICK ROBERT BODLEY.

Witnesses:
HENRY BIRKBECK,
34 *Southampton Buildings, London, England.*
GEORGE W. KEY,
*Clerk to the above.*